(12) United States Patent
Hou

(10) Patent No.: US 11,146,841 B2
(45) Date of Patent: Oct. 12, 2021

(54) VOICE-BASED TELEVISION CONTROL METHOD AND INTELLIGENT TERMINAL

(71) Applicants: BAIDU ONLINE NETWORK TECHNOLOGY (BEIJING) CO., LTD., Beijing (CN); SHANGHAI XIAODU TECHNOLOGY CO., LTD, Shanghai (CN)

(72) Inventor: Zaipeng Hou, Beijing (CN)

(73) Assignees: BAIDU ONLINE NETWORK TECHNOLOGY (BEIJING) CO., LTD.; SHANGHAI XIAODU TECHNOLOGY CO. LTD.

( * ) Notice: Subject to any disclaimer, the term of this patent is extended or adjusted under 35 U.S.C. 154(b) by 184 days.

(21) Appl. No.: 16/564,807

(22) Filed: Sep. 9, 2019

(65) Prior Publication Data
US 2019/0394515 A1 Dec. 26, 2019

(30) Foreign Application Priority Data
Dec. 12, 2018 (CN) ......................... 2018115116131.X

(51) Int. Cl.
G10L 15/26 (2006.01)
H04N 21/422 (2011.01)
(Continued)

(52) U.S. Cl.
CPC ....... *H04N 21/42203* (2013.01); *G06F 3/167* (2013.01); *G10L 15/26* (2013.01); *G08C 2201/31* (2013.01); *G10L 2015/223* (2013.01)

(58) Field of Classification Search
None
See application file for complete search history.

(56) References Cited

U.S. PATENT DOCUMENTS 6,246,672 B1 * 6/2001 Lumelsky ............. H04L 69/329
370/310
6,415,257 B1 * 7/2002 Junqua .................... G10L 17/00
704/275

(Continued)

FOREIGN PATENT DOCUMENTS

CN 102737497 A 10/2012
CN 102800341 A 11/2012
(Continued)

OTHER PUBLICATIONS

Office Action issued in Chinese Patent Application No. 201811516131. X, dated Sep. 1, 2020, 8 pages.
(Continued)

*Primary Examiner* — Neeraj Sharma
(74) *Attorney, Agent, or Firm* — Dilworth IP, LLC

(57) ABSTRACT

The present disclosure provides a voice-based television control method and an intelligent terminal, which include: when a television is in a standby state, an intelligent terminal receives a first voice signal, recognizes a target playback operation corresponding to the first voice signal, determines a playback type of the target playback operation, and controls the television to play content corresponding to the target playback operation according to the playback type of the target playback operation. When a television is in the standby state, the method can automatically turn on a screen of the television to play content required by a user according to different voice requirements input by the user, or automatically play content required by a user by voice in a state where the screen is off, which provides users more choices and improves the user experience.

17 Claims, 4 Drawing Sheets

(51) Int. Cl.
*G06F 3/16* (2006.01)
*G10L 15/22* (2006.01)

(56) References Cited

U.S. PATENT DOCUMENTS

| | | | |
|---|---|---|---|
| 9,256,396 B2* | 2/2016 | Monson | G06F 3/167 |
| 10,467,616 B2* | 11/2019 | May | G06F 21/32 |
| 10,674,189 B2* | 6/2020 | Dhandapani | H04N 21/8586 |
| 10,885,091 B1* | 1/2021 | Meng | G06F 16/433 |
| 11,076,039 B2* | 7/2021 | Weinstein | G06F 16/90332 |
| 2006/0123053 A1* | 6/2006 | Scannell, Jr. | G06F 16/9577 |
| 2010/0002150 A1 | 1/2010 | Price et al. | |
| 2014/0009609 A1 | 1/2014 | Webster et al. | |
| 2016/0212488 A1* | 7/2016 | Os | H04N 21/2541 |
| 2018/0122378 A1 | 5/2018 | Mixter et al. | |
| 2018/0261247 A1* | 9/2018 | Bellotti | H04N 5/76 |
| 2018/0285065 A1 | 10/2018 | Jeong | |
| 2018/0322881 A1* | 11/2018 | Min | G06F 3/167 |
| 2019/0043510 A1* | 2/2019 | Wang | H04L 47/125 |
| 2019/0347063 A1* | 11/2019 | Liu | G06F 3/167 |
| 2020/0021894 A1* | 1/2020 | Sanchez | G10L 15/22 |

FOREIGN PATENT DOCUMENTS

| | | |
|---|---|---|
| CN | 104639967 A | 5/2015 |
| CN | 107710148 A | 2/2018 |
| CN | 108877802 A | 11/2018 |
| JP | 2000056944 A | 2/2000 |
| JP | 2003051993 A | 2/2003 |
| JP | 2013088535 A | 5/2013 |
| JP | 2018190436 A | 11/2018 |
| KR | 101716732 B1 | 3/2017 |

OTHER PUBLICATIONS

First Office Action in JP Patent Application No. 2019-167714 dated Oct. 27, 2020.

* cited by examiner

VOICE-BASED TELEVISION CONTROL METHOD AND INTELLIGENT TERMINAL

CROSS-REFERENCE TO RELATED APPLICATIONS

The present application claims priority to Chinese application No. 201811516131.X, filed on Dec. 12, 2018, which is incorporated by reference in its entirety.

TECHNICAL FIELD

The present disclosure relates to the field of intelligent television, and in particular, to a voice-based television control method and an intelligent terminal.

BACKGROUND

With the rapid development of technology and the Internet, the functions of televisions are becoming more and more powerful. The functions of televisions are not limited to providing videos and network programs for families, but also involve surfing the Internet, playing games, listening to music and so on.

Currently, intelligent televisions and intelligent television boxes on the market can only implement these functions after a user turns on the screen of the television. When the user turns off the screen of the television through a remote control, that is, when the television and the television box are in a standby state, the television cannot support interactions by remote control buttons or voice. If the user needs to watch the television or has other needs, he or she must restart the screen of the television through the remote control, the operation is troublesome, and the user experience is poor.

SUMMARY

The present disclosure provides a voice-based television control method and an intelligent terminal, which is convenient for a user to control a television and improves the user experience.

A first aspect of the present disclosure provides a voice-based television control method, including:

receiving, by an intelligent terminal, a first voice signal when a television is in a standby state;

recognizing, by the intelligent terminal, a target playback operation corresponding to the first voice signal;

determining, by the intelligent terminal, a playback type of the target playback operation; and controlling, by the intelligent terminal, the television to play content corresponding to the target playback operation, according to the playback type of the target playback operation.

Optionally, the controlling, by the intelligent terminal, the television to play content corresponding to the target playback operation, according to the playback type of the target playback operation includes:

controlling, by the intelligent terminal, a screen of the television to be turned on when the playback type of the target playback operation is an image playback type; and displaying, by the intelligent terminal, the content corresponding to the target playback operation through the screen of television.

Optionally, the controlling, by the intelligent terminal, the television to play content corresponding to the target playback operation, according to the playback type of the target playback operation includes:

controlling, by the intelligent terminal, the television to play the content corresponding to the target playback operation through audio when the playback type of the target playback operation is an audio playback type, where a screen of the television is in an off state when the television plays the content corresponding to the target playback operation through audio.

Optionally, the playback type of the target playback operation includes an image playback type and an audio playback type, and the determining, by the intelligent terminal, the playback type of the target playback operation includes:

determining, by the intelligent terminal, the playback type of the target playback operation according to the target playback operation and a pre-stored correspondence between a user operation and the playback type.

Optionally, the correspondence between the user operation and the play type is user-defined.

Optionally, the playback type of the target playback operation includes an image playback type and an audio playback type, and the determining, by the intelligent terminal, the playback type of the target playback operation includes:

determining, by the intelligent terminal, the playback type of the target playback operation according to a keyword associated with the playback type contained in the first voice signal.

Optionally, the method further includes:

receiving, by the intelligent terminal, a second voice signal when the television is in a power-on state;

recognizing, by the intelligent terminal, a target playback operation corresponding to the second voice signal; and displaying, by the intelligent terminal, content of the target playback operation corresponding to the second voice signal according to the target playback operation corresponding to the second voice signal.

Optionally, the intelligent terminal is the television, an intelligent television box connected to the television, or an intelligent speaker connected to the television.

A second aspect of the present disclosure provides an intelligent terminal, including:

a receiving module, configured to receive a first voice signal when a television is in a standby state;

a recognizing module, configured to recognize a target playback operation corresponding to the first voice signal;

a determining module, configured to determine a playback type of the target playback operation; and a playing module, configured to control the television to play content corresponding to the target playback operation according to the playback type of the target playback operation.

Optionally, the playing module is specifically configured to:

control a screen of the television to be turned on when the playback type of the target playback operation is an image playback type; and display the content corresponding to the target playback operation through the screen of television.

Optionally, the playing module is specifically configured to:

control the television to play the content corresponding to the target playback operation through audio when the playback type of the target playback operation is an audio playback type, where a screen of the television is in an off state when the television plays the content corresponding to the target playback operation through audio.

Optionally, the playback type of the target playback operation includes an image playback type and an audio playback type, and the determining module is specifically configured to:

determine the playback type of the target playback operation according to the target playback operation and a pre-stored correspondence between a user operation and the playback type.

Optionally, the correspondence between the user operation and the play type is user-defined.

Optionally, the playback type of the target playback operation includes an image playback type and an audio playback type, and the determining module is specifically configured to:

determine the playback type of the target playback operation according to a keyword associated with the playback type contained in the first voice signal.

Optionally, the receiving module is further configured to receive a second voice signal when the television is in a power-on state;

the recognizing module is further configured to recognize a target playback operation corresponding to the second voice signal; and the playing module is further configured to display content of the target playback operation corresponding to the second voice signal according to the target playback operation corresponding to the second voice signal.

Optionally, the intelligent terminal is the television, an intelligent television box connected to the television, or an intelligent speaker connected to the television.

A third aspect of the present disclosure provides an intelligent terminal, which is an intelligent television or an intelligent television box, including: a processor, a memory, an audio device and a transceiver, where the audio device is configured to receive a voice signal, the memory is configured to store instructions, the transceiver is configured to communicate with a further device, and the processor is configured to execute the instructions stored in the memory to cause the intelligent terminal to perform the method of the first aspect of the present disclosure.

A fourth aspect of the present disclosure provides a computer readable storage medium having instructions stored thereon, where the instructions, when executed, cause a computer to perform the method of the first aspect of the present disclosure.

The voice-based television control method and the intelligent terminal provided by the present disclosure include: when a television is in a standby state, an intelligent terminal receives a first voice signal, recognizes a target playback operation corresponding to the first voice signal, determines a playback type of the target playback operation, and controls the television to play content corresponding to the target playback operation according to the playback type of the target playback operation. When a television is in the standby state, the method can automatically turn on a screen of the television to play content required by a user according to different voice requirements input by the user, or automatically play content required by a user through audio with the screen in a state where the screen is off, which provides users more choices and improves user experience.

BRIEF DESCRIPTION OF THE DRAWINGS

The accompanying drawings herein are incorporated into the specification and form part of the specification, showing embodiments consistent with the present disclosure and used together with the specification to explain the principles of the present disclosure.

Figure 1:
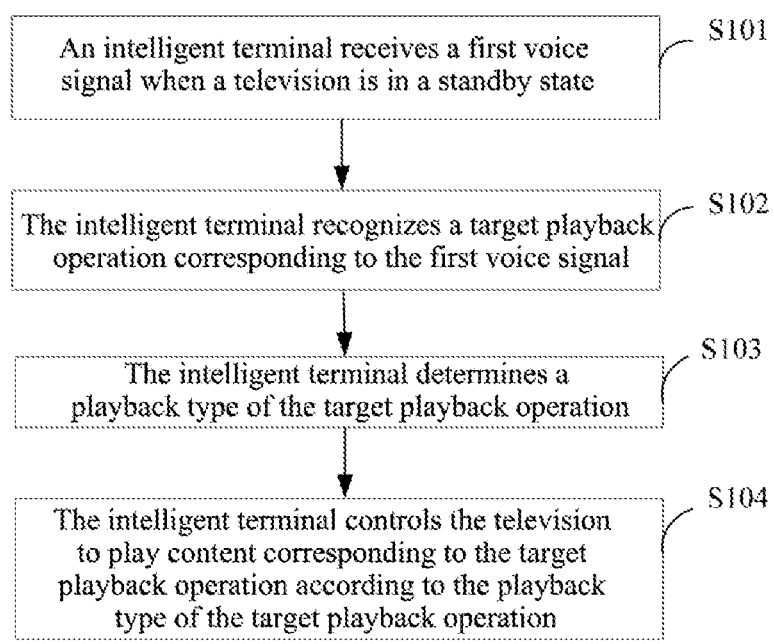
FIG. 1 is a flowchart of a voice-based television control method according to Embodiment 1 of the present disclosure.

Through the above drawings, specific embodiments of the present disclosure have been shown, which will be described in more detail later. These drawings and text descriptions are not intended to limit the scope of the concept of the present disclosure in any way, but rather to illustrate the concept of the present disclosure for those skilled in the art by referring to specific embodiments.

DESCRIPTION OF EMBODIMENTS

In order to make the objectives, technical solutions, and advantages of the embodiments of the present disclosure more clear, the technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of the present disclosure.

The present disclosure provides a voice-based intelligent television control method, and the method is performed by an intelligent terminal, which is an intelligent television or an intelligent television box.

Similar to smart phone, intelligent television is a general term for a type of televisions which have a fully open platform and are equipped with an operating system, such as Android. Programs, such as software, games, provided by third-party service providers can be installed and uninstalled on this type of televisions by users themselves to expand the functions of the televisions continuously through such programs. And this type of televisions can be used to surf the Internet through network cables or wireless networks.

Moreover, intelligent television has the advantage of an application platform that traditional television manufacturers do not have. After connecting to the network, it can provide a variety of entertainment, information and learning resources, such as IE browser, full high definition (HD) 3D somatosensory game, video call, family KTV and education online, which can be expanded infinitely, and it further can support organizations and individuals, professional and amateur software enthusiasts to independently develop and share tens of thousands of useful functional software together. It will implement various application services, such as network search, internet protocol (IP) television, video on demand (VOD), digital music, online news, and network video call. Users can search television channels and websites, record television shows, play satellite and cable television programs and network videos.

Television box, also known as intelligent television box, is a small computing terminal device. Web browsing, network video playback and application installation can be implemented on the traditional television by simply connecting it to a traditional television through a high definition multimedia interface (HDMI) or a color difference line. Even photos and videos in users' phones and tablets can be projected into a big screen television at home.

Intelligent television box is also equipped with an operating system (e.g., Android system), which is very similar to the traditional set-top box, but much more powerful than the traditional set-top box in its content and functions. There is almost no big difference between the intelligent television box and intelligent television, except that it does not have a display function, that is, the intelligent television box has most of the functions of intelligent television. Therefore, an intelligent television can also be considered as a traditional television with an intelligent television box built-in.

FIG. 1 is a flowchart of a voice-based television control method according to Embodiment 1 of the present disclosure. As shown in FIG. 1, the method provided by the embodiment includes the following steps.

Step 101, an intelligent terminal receives a first voice signal when a television is in a standby state.

The intelligent terminal is a television, an intelligent television box connected to the television, or an intelligent speaker connected to the television. When the intelligent terminal is the television, the television is an intelligent television. When the intelligent terminal is an intelligent television box or an intelligent speaker, the television connected to the intelligent television box or the intelligent speaker may be a traditional television or an intelligent television. The intelligent television box and intelligent speaker can be connected to a traditional television or intelligent television by wire.

A television being in a standby state refers to that the screen of the television is turned off, but the television is connected to the power source, some components of the television are turned off and some components of the television are in a working state. The television still has power consumption in the standby state.

In the embodiment, when the intelligent terminal is an intelligent television, the intelligent television can still receive a voice signal when it is in the standby state, that is, when the intelligent television is in the standby state, a module used for processing a voice signal is still in a working state, and the module used for processing the voice signal includes a hardware module and a software module.

The hardware module may include a microphone and a processing unit, the microphone is used to collect the voice signal and the processing unit is used to perform a series of operations such as recognizing the collected voice signal.

The software module may be a voice application (app) running on the intelligent television, for example, Xiaodu voice assistant, and the voice app is used to control voice interaction. In the embodiment, the voice app installed on the intelligent television is online when the intelligent television is in the standby state and power-on state, to provide services for users.

When the intelligent terminal is an intelligent television box or an intelligent speaker, the intelligent television box or the intelligent speaker is connected to the power source while being connected to the television. When the television is in the standby state, the intelligent television box or the intelligent speaker works normally.

In the embodiment, the shutdown of the screen of the television can be controlled by a remote control, and a user turns off the screen of the television through the on/off button on the remote control. The screen of the television can also be turned off by the voice app. A user inputs a voice signal containing a keyword for shutdown to the television, and the voice app on the television recognizes the voice signal and then turns off the screen of the television. For example, in the power-on state, a user says "Xiaodu, Xiaodu, turn off the television" to the television, and the Xiaodu voice assistant receives the voice signal and then turns off the screen of the television.

Step 102, the intelligent terminal recognizes a target playback operation corresponding to the first voice signal.

In the present disclosure, the intelligent terminal includes a voice recognition module and an intent parsing module. The voice recognition module is configured to recognize a person's voice and convert the voice signal into text information. The intent parsing module is configured to analyze and process the text information to obtain the user's intent, that is, recognize a target playback operation corresponding to the first voice signal.

For example, the first voice signal input by the user is "play Chou XX's song", and through processing of the voice recognition module and the intent parsing module, it is determined that the target playback operation corresponding to the first voice signal is to play Chou XX's song on the television.

For another example, the first voice signal input by the user is "weather in Beijing", and the intelligent terminal recognizes that the target playback operation corresponding to the first voice signal is to query the weather in Beijing.

For another example, the first voice signal input by the user is "Who is XX?", and the intelligent terminal recognizes that the target playback operation corresponding to the first voice signal is to query the personal information of XX.

Step 103, the intelligent terminal determines a playback type of the target playback operation.

In the embodiment, the playback type of the target playback operation may include an audio playback type and an image playback type.

The playback operation corresponding to the audio playback type can be satisfied by text-to-speech (TTS) broadcast or resource audio, without turning on the screen of the television. The playback operation corresponding to the audio playback type may be, for example, weather inquiry, encyclopedia questions and answers, common information inquiry, intelligent home control, chat, listening to music, listening to audio story books, listening to news, etc.

The content of the playback operation corresponding to the image playback type includes all content that needs to be displayed by means of the screen of the television, and is not limited to pictures, albums, but also includes videos, live broadcast, and the like.

In an exemplary manner, the intelligent terminal determines the playback type of the target playback operation according to the target playback operation and a pre-stored correspondence between a user operation and the playback type.

The correspondence includes user operations corresponding to the audio playback type and the image playback type respectively. For example, the user operation corresponding to the audio playback type is: playing weather forecast, playing crosstalk, playing news, playing music, or the like. The user operation corresponding to the image playback type is: playing a movie, playing television series, playing live broadcast, watching a picture, viewing an album, or the like.

The correspondence between the user operation and the playback type may be user-defined or set by the system itself. Correspondingly, the intelligent terminal needs to provide a configuration page, and the user opens the configuration page through the television or an intelligent phone connected to the television, and associates the user operation with the playback type in the configuration page.

The intelligent terminal queries the correspondence according to the target playback operation, and obtains the playback type corresponding to the target playback operation.

In another exemplary manner, the intelligent terminal determines the playback type of the target playback operation according to a keyword associated with the playback type contained in the first voice signal.

The keyword associated with the playback type may be a keyword such as "voice play", "video play", "listen", "look", "display", and the like. For example, if a user wants to watch weather forecast, he or she can input a voice signal "watch the weather forecast", and "watch" is the keyword associated with the playback type, and the intelligent terminal determines that the playback type is the image playback type according to the "watch".

If a user wants to hear crosstalk, he or she can input a voice signal "listen to the crosstalk" or "play crosstalk by audio", and "listen" and the "play by audio" are the keywords associated with the playback type, and the intelligent terminal can determine that the playback type is the audio playback type according to "listen" or "play by audio".

If a user wants to watch crosstalk program, he or she can input a voice signal "watch a crosstalk program", and "watch" is the keyword associated with the playback type, and the intelligent terminal can determine that the playback type is the image playback type according to "watch".

Step 104, the intelligent terminal controls the television to play content corresponding to the target playback operation according to the playback type of the target playback operation.

When the playback type of the target playback operation is the image playback type, the intelligent terminal controls the screen of the television to be turned on, and the intelligent terminal displays the content corresponding to the target playback operation through the screen of the television.

When the intelligent terminal is the television, the television controls its own switch module to power on, and the screen of the television is turned on. When the intelligent terminal is an intelligent television box or an intelligent speaker, the intelligent television box or the intelligent speaker sends a power-on command to the television. The television controls the switch module to power on after receiving the power-on command, and the screen of the television is turned on.

After recognizing the target playback operation, the intelligent terminal searches for the content corresponding to the target playback operation, and automatically plays the content corresponding to the target playback operation after the screen of the television is turned on, and the user does not need to manually search for and play the content that is desired to be viewed, thereby simplifying the user operation and improving the user experience.

For example, when the screen of the television is off, the user says "Andy Lau's movie", "view family album", and the Xiaodu voice assistant will play "the screen of the television will be turned on for you soon" by voice, then automatically turn on the screen of the television and display the results of Andy Lau's movie, family album content.

When the playback type of the target playback operation is the audio playback type, the intelligent terminal controls the television to play the content corresponding to the target playback operation through audio, where the screen of the television is in an off state when the television plays the content corresponding to the target playback operation through audio. In this way, the television is equivalent to an intelligent speaker that can interact with the user by voice.

For example, when the screen of the television is off, the user says "weather in Beijing", "Guo Degang's crosstalk", "BBC news", the television will return and play TTS broadcast of the weather, Guo Degang's crosstalk audio and BBC news audio to the user with the screen being off, and does not need to play through the screen of the television.

In the embodiment, the first voice signal may also be "turn on the television", and the intelligent terminal determines that the target playback operation corresponding to the first voice signal is to turn on the television, then controls the screen of the television to be turned on, and displays the main page (HOME page) of the television after the screen of the television is turned on.

In the embodiment, when a television is in the standby state, an intelligent terminal receives a first voice signal, recognizes a target playback operation corresponding to the first voice signal, determines a playback type of the target playback operation, and controls the television to play content corresponding to the target playback operation according to the playback type of the target playback operation. When the television is in the standby state, the method can automatically turn on a screen of the television to play content required by a user according to different voice requirements input by the user, or automatically play content required by a user through audio in a state where the screen is off, which provides users more choices and improves user experience.

Figure 2:
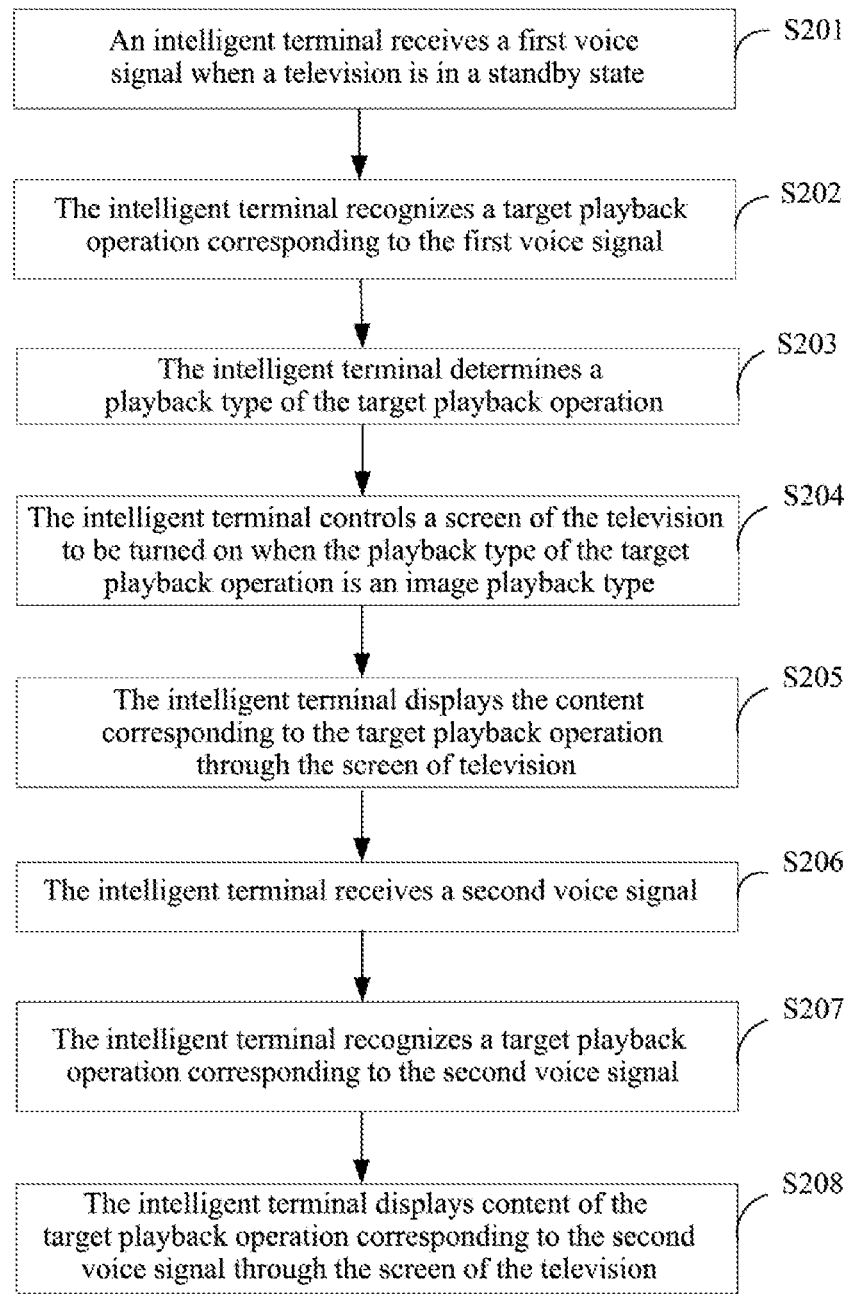
FIG. 2 is a flowchart of a voice-based television control method according to Embodiment 2 of the present disclosure.

FIG. 2 is a flowchart of a voice-based television control method according to Embodiment 2 of the present disclosure. As shown in FIG. 2, the method provided by the embodiment includes the following steps.

Step 201, an intelligent terminal receives a first voice signal when a television is in a standby state.

Step 202, the intelligent terminal recognizes a target playback operation corresponding to the first voice signal.

Step 203, the intelligent terminal determines a playback type of the target playback operation.

Step 204, the intelligent terminal controls a screen of the television to be turned on when the playback type of the target playback operation is an image playback type.

Step 205, the intelligent terminal displays the content corresponding to the target playback operation through the screen of television.

For specific implementations of step 201 to step 205, refer to the related description of Embodiment 1, and details are not described herein again.

Step 206, the intelligent terminal receives a second voice signal.

After the intelligent terminal controls the screen of the television to be turned on, the television is in a power-on state, and in the power-on state, the intelligent terminal receives the second voice signal input by a user.

Step 207, the intelligent terminal recognizes a target playback operation corresponding to the second voice signal.

The recognition process refers to the process of recognizing the target playback operation corresponding to the first voice signal in Embodiment 1.

Step 208, the intelligent terminal displays content of the target playback operation corresponding to the second voice signal through the screen of the television.

When the television is in the power-on state, the content of the target playback operation corresponding to the second voice signal is directly displayed on the screen of the television, and it is no longer necessary to determine the playback type of the target playback operation corresponding to the second voice signal.

When the television is in the power-on state, interacting with the television through voice can make hands free, and the interaction is simpler and more efficient, which improves the user experience.

Figure 3:
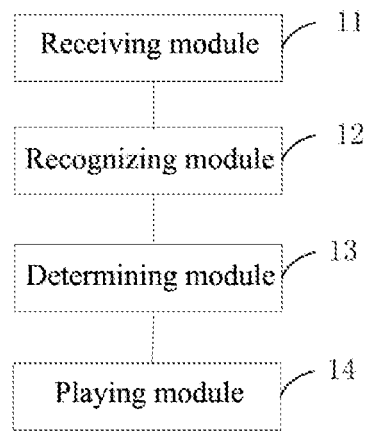
FIG. 3 is a schematic structural diagram of an intelligent terminal according to Embodiment 3 of the present disclosure.

FIG. 3 is a schematic structural diagram of an intelligent terminal according to Embodiment 3 of the present disclosure. As shown in FIG. 3, the intelligent terminal provided by the embodiment includes:

a receiving module 11, configured to receive a first voice signal when a television is in a standby state;

a recognizing module 12, configured to recognize a target playback operation corresponding to the first voice signal;

a determining module 13, configured to determine a playback type of the target playback operation;

a playing module 14, configured to control the television to play content corresponding to the target playback operation according to the playback type of the target playback operation.

Optionally, the playing module 14 is specifically configured to:

control a screen of the television to be turned on when the playback type of the target playback operation is an image playback type;

display the content corresponding to the target playback operation through the screen of television.

Optionally, the playing module 14 is specifically configured to:

control the television to play the content corresponding to the target playback operation through audio when the playback type of the target playback operation is an audio playback type, where a screen of the television is in an off state when the television plays the content corresponding to the target playback operation through audio.

Optionally, the playback type of the target playback operation includes an image playback type and an audio playback type, and the determining module 13 is specifically configured to:

determine the playback type of the target playback operation according to the target playback operation and a pre-stored correspondence between a user operation and the playback type.

Optionally, the correspondence between the user operation and the play type is user-defined.

Optionally, the playback type of the target playback operation includes an image playback type and an audio playback type, and the determining module 13 is specifically configured to:

determine the playback type of the target playback operation according to a keyword associated with the playback type contained in the first voice signal.

Optionally, the receiving module 11 is further configured to receive a second voice signal when the television is in a power-on state;

the recognizing module 12 is further configured to recognize a target playback operation corresponding to the second voice signal;

the playing module 14 is further configured to display content of the target playback operation corresponding to the second voice signal according to the target playback operation corresponding to the second voice signal.

Optionally, the intelligent terminal is the television, an intelligent television box connected to the television, or an intelligent speaker connected to the television.

The intelligent terminal provided by the embodiment may be used to perform the method described in Embodiment 1 or Embodiment 2. The specific implementations and technical effects are similar, and details are not described herein again.

Figure 4:
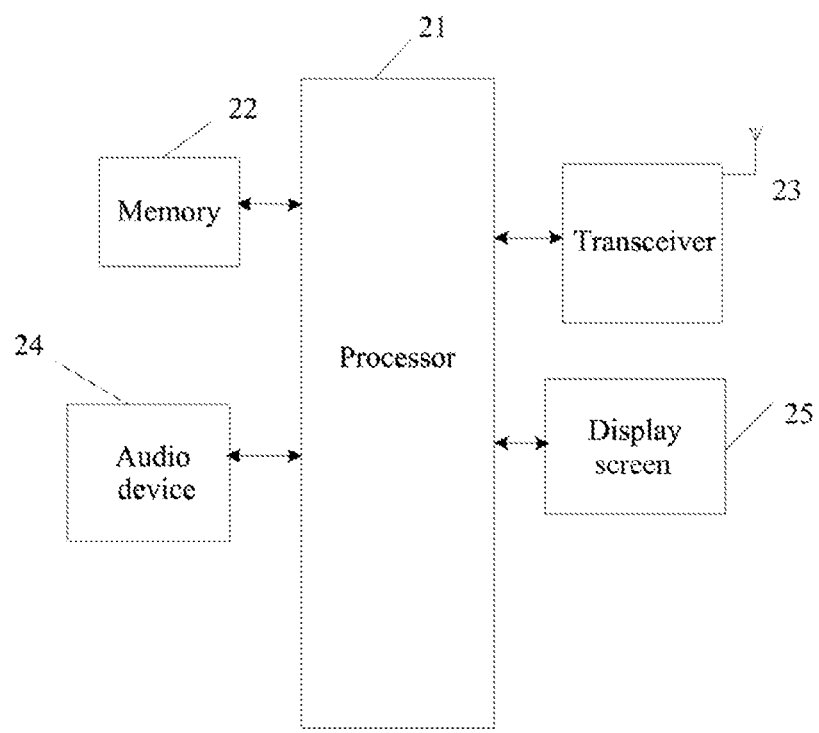
FIG. 4 is a schematic structural diagram of an intelligent television according to Embodiment 4 of the present disclosure.

FIG. 4 is a schematic structural diagram of an intelligent television according to Embodiment 4 of the present disclosure. As shown in FIG. 4, the intelligent television provided by the embodiment includes a processor 21, a memory 22, a transceiver 23, an audio device 24 and a display screen 25, and the memory 22, the transceiver 23, the audio device 24 and the display screen 25 are connected and communicated with the processor 21 via a bus. The memory 22 is configured to store instructions, the audio device 24 is configured to process voice signals, the display screen 25 is configured to display image signals, the transceiver 23 is configured to communicate with another device, and the processor 21 is configured to perform the instructions stored in the memory 22 to cause the intelligent television perform the method as described in Embodiment 1 or Embodiment 2, and details are not described herein again.

The processor 21 may be a Microcontroller Unit (MCU), and the MCU is also called a Single Chip Microcomputer or a single chip. The processor 21 may also be a Central Process Unit (CPU), digital signal processor (DSP), application specific integrated circuit (ASIC), field programmable gate array (FPGA) or other programmable logic device, discrete gate or transistor logic device.

The memory 22 can be implemented by any type of volatile or non-volatile memory device or a combination thereof, such as Static Random Access Memory (SRAM), Electrically Erasable Programmable read only memory (EEPROM), Erasable Programmable Read Only Memory (EPROM), Programmable Read-Only Memory (PROM), Read Only Memory (ROM), magnetic memory, flash memory, disk or optical disk.

The transceiver 23 can establish a wired or wireless communication link with another device such that the intelligent device can access a wireless network based on a communication standard, such as WiFi, 2G or 3G, or a combination thereof. In an exemplary embodiment, the transceiver 23 further includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

The bus may be an Industry Standard Architecture (ISA) bus, a Peripheral Component Interconnect (PCI) bus, or an Extended Industry Standard Architecture (EISA) bus. The bus can be divided into an address bus, a data bus, a control bus, and the like. For ease of representation, the bus in the drawings of the present application is not limited to only one bus or one type of bus.

The audio device 24 may include audio input and output devices, such as a microphone and a speaker, and optionally, may further include an audio codec device or an audio enhancement device. The audio device 24 is capable of acquiring a voice signal input by a user and playing audio signals.

The display screen 25 is used to display data such as images and videos output by the television, and the display screen 25 may be a Light Emitting Diode (LED) screen.

The intelligent television shown in FIG. 4 shows only some of the components associated with the present disclosure, and the intelligent television may also include more components, which are not limited in the present disclosure.

Figure 5:
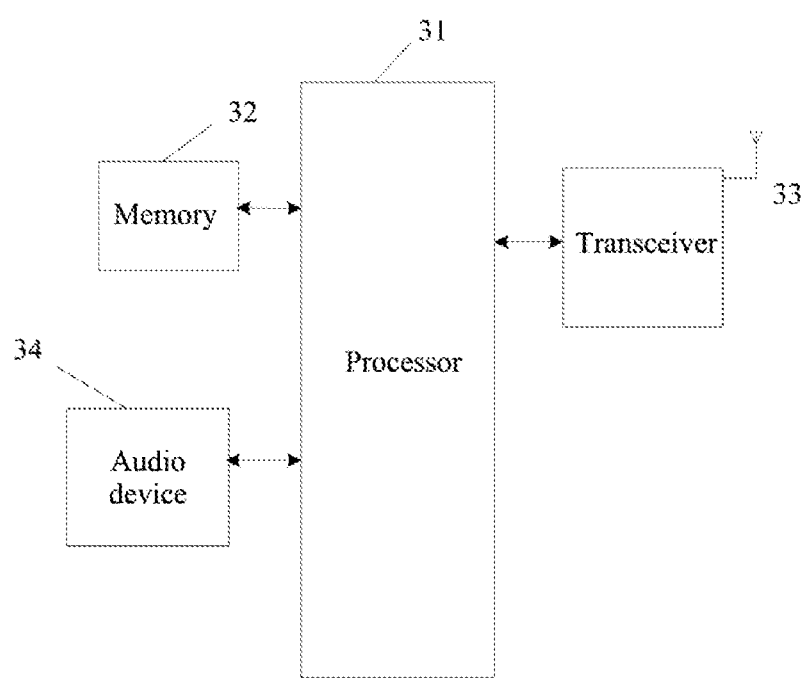
FIG. 5 is a schematic structural diagram of an intelligent television box according to Embodiment 5 of the present disclosure.

FIG. 5 is a schematic structural diagram of an intelligent television box according to Embodiment 5 of the present disclosure. As shown in FIG. 5, the intelligent television box provided in the embodiment includes a processor 31, a memory 32, a transceiver 33 and an audio device 34, and the memory 32, the transceiver 33 and the audio device 34 are connected and communicated to the processor 31 via a bus. The memory 32 is configured to store instructions, the audio device 34 is configured to process voice signals, and the transceiver 33 is configured to communicate with other devices, and the processor 31 is configured to execute the instructions stored in the memory 32 to cause the intelligent television box perform the method as described in Embodiment 1 or Embodiment 2, and details are not described herein again.

Compared with the television, the intelligent television box has no display screen, and the intelligent television box can be connected to an intelligent phone and controlled by the intelligent phone. Of course, the intelligent television box can also include a display screen.

When the intelligent terminal is an intelligent speaker, the structure of the intelligent speaker can refer to the intelligent television box shown in FIG. 5. Similarly, the intelligent speaker can have a display screen or no display screen.

Embodiment 6 of the present disclosure provides a computer readable storage medium having instructions stored thereon, and the instructions, when executed, cause a computer to perform the method as described in Embodiment 1 or Embodiment 2.

What is claimed is:

1. A voice-based television control method, comprising:
receiving, by an intelligent terminal, a first voice signal when a television is in a standby state;
recognizing, by the intelligent terminal, a target playback operation corresponding to the first voice signal;
determining, by the intelligent terminal, a playback type of the target playback operation; and
controlling, by the intelligent terminal, the television to play content corresponding to the target playback operation, according to the playback type of the target playback operation; and
receiving, by the intelligent terminal, a second voice signal when the television is in a power-on state;
recognizing, by the intelligent terminal, a target playback operation corresponding to the second voice signal; and
displaying, by the intelligent terminal, content of the target playback operation corresponding to the second voice signal through a screen of the television;
wherein the television is an intelligent television, and a voice app installed on the intelligent television is online when the intelligent television is in a standby state and a power-on state, to provide services for users.

2. The method according to claim 1, wherein the controlling, by the intelligent terminal, the television to play content corresponding to the target playback operation, according to the playback type of the target playback operation comprises:
controlling, by the intelligent terminal, a screen of the television to be turned on when the playback type of the target playback operation is an image playback type; and
displaying, by the intelligent terminal, the content corresponding to the target playback operation through the screen of television.

3. The method according to claim 1, wherein the controlling, by the intelligent terminal, the television to play content corresponding to the target playback operation, according to the playback type of the target playback operation comprises:
controlling, by the intelligent terminal, the television to play the content corresponding to the target playback operation through audio when the playback type of the target playback operation is an audio playback type, wherein a screen of the television is in an off state when the television plays the content corresponding to the target playback operation through audio.

4. The method according to claim 1, wherein the playback type of the target playback operation comprises an image playback type and an audio playback type, and the determining, by the intelligent terminal, the playback type of the target playback operation comprises:
determining, by the intelligent terminal, the playback type of the target playback operation according to the target playback operation and a pre-stored correspondence between a user operation and the playback type.

5. The method according to claim 4, wherein the correspondence between the user operation and the play type is user-defined.

6. The method according to claim 1, wherein the playback type of the target playback operation comprises an image playback type and an audio playback type, and the determining, by the intelligent terminal, the playback type of the target playback operation comprises:
determining, by the intelligent terminal, the playback type of the target playback operation according to a keyword associated with the playback type contained in the first voice signal.

7. The method according to claim 1, wherein the intelligent terminal is the television, an intelligent television box connected to the television, or an intelligent speaker connected to the television.

8. An intelligent terminal, comprising: a processor, a memory, an audio device and a transceiver, wherein the audio device is configured to receive a voice signal, the memory is configured to store instructions, the transceiver is configured to communicate with a further device, and the processor is configured to execute the instructions stored in the memory to cause the intelligent terminal to:
receive a first voice signal when a television is in a standby state;
recognize a target playback operation corresponding to the first voice signal;
determine a playback type of the target playback operation; and
control the television to play content corresponding to the target playback operation according to the playback type of the target playback operation; and
receive a second voice signal when the television is in a power-on state;
recognize a target playback operation corresponding to the second voice signal; and display content of the target playback operation corresponding to the second voice signal through screen of the television;
wherein the television is an intelligent television, and a voice app installed on the intelligent television is online when the intelligent television is in a standby state and a power-on state, to provide services for users.

9. The terminal according to claim 8, wherein the processor executes the instructions stored in the memory to cause the intelligent terminal further to:
control a screen of the television to be turned on when the playback type of the target playback operation is an image playback type; and
display the content corresponding to the target playback operation through the screen of television.

10. The terminal according to claim 8, wherein the processor executes the instructions stored in the memory to cause the intelligent terminal further to:
control the television to play the content corresponding to the target playback operation through audio when the playback type of the target playback operation is an audio playback type, wherein a screen of the television is in an off state when the television plays the content corresponding to the target playback operation through audio.

11. The terminal according to claim 8, wherein the playback type of the target playback operation comprises an image playback type and an audio playback type, and the processor executes the instructions stored in the memory to cause the intelligent terminal further to:
determine the playback type of the target playback operation according to the target playback operation and a pre-stored correspondence between a user operation and the playback type.

12. The terminal according to claim 11, wherein the correspondence between the user operations and the playback type is user-defined.

13. The terminal according to claim 8, wherein the playback type of the target playback operation comprises an image playback type and an audio playback type, and the processor executes the instructions stored in the memory to cause the intelligent terminal further to:
determine the playback type of the target playback operation according to a keyword associated with the playback type contained in the first voice signal.

14. The terminal according to claim 8, wherein the intelligent terminal is the television, an intelligent television box connected to the television, or an intelligent speaker connected to the television.

15. A non-transitory computer readable storage medium having instructions stored thereon, wherein the instructions, when executed, cause a computer to perform the method of claim 1.

16. The method according to claim 1, wherein the playback type of the target playback operation comprises an audio playback type and an image playback type.

17. The terminal according to claim 8, wherein the playback type of the target playback operation comprises an audio playback type and an image playback type.

* * * * *